United States Patent
Tian et al.

(10) Patent No.: US 10,487,265 B1
(45) Date of Patent: Nov. 26, 2019

(54) METHOD FOR PYROLYSIS TREATMENT OF OILY SLUDGE AND ENVIRONMENT-FRIENDLY RENOVATION OF THE RESIDUE THEREOF WITH HUMIC ACID SUBSTANCE

(71) Applicant: China University of Petroleum (East China), Qingdao (CN)

(72) Inventors: Yuanyu Tian, Qingdao (CN); Yingyun Qiao, Qingdao (CN); Kechang Xie, Qingdao (CN); Zhaohe Yang, Qingdao (CN); Haifeng Zhou, Qingdao (CN); Jie Li, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/293,197

(22) Filed: Mar. 5, 2019

(30) Foreign Application Priority Data

Dec. 10, 2018 (CN) .......................... 2018 1 1501371

(51) Int. Cl.
| | | |
|---|---|---|
| *C10B 53/07* | (2006.01) | |
| *C05G 1/00* | (2006.01) | |
| *C05B 7/00* | (2006.01) | |
| *B09C 1/06* | (2006.01) | |
| *C05F 11/02* | (2006.01) | |
| *C05F 11/08* | (2006.01) | |
| *C05C 11/00* | (2006.01) | |

(52) U.S. Cl.
CPC ............ *C10B 53/07* (2013.01); *B09C 1/065* (2013.01); *C05B 7/00* (2013.01); *C05C 11/00* (2013.01); *C05F 11/02* (2013.01); *C05F 11/08* (2013.01); *C05G 1/00* (2013.01)

(58) Field of Classification Search
CPC ..................................................... C10B 53/07
See application file for complete search history.

(56) References Cited

U.S. PATENT DOCUMENTS

| | | | | |
|---|---|---|---|---|
| 3,855,070 A * | 12/1974 | Squires | ...................... | B01J 8/32 201/23 |
| 4,311,670 A * | 1/1982 | Nieminen | .................. | B01J 8/32 34/363 |
| 6,669,822 B1 * | 12/2003 | Fujimura | ................ | C10B 47/44 201/20 |
| 9,261,274 B2 * | 2/2016 | Jiang | ......................... | C01B 3/50 |
| 9,464,245 B2 * | 10/2016 | Gao | ......................... | C10B 49/10 |
| 9,809,770 B2 * | 11/2017 | Xu | .......................... | C10K 3/023 |
| 2006/0201641 A1 * | 9/2006 | Harris | .................. | D21C 11/125 162/37 |
| 2010/0162625 A1 * | 7/2010 | Mills | ........................ | C10L 1/02 48/76 |

* cited by examiner

*Primary Examiner* — Jonathan Miller
(74) *Attorney, Agent, or Firm* — Volpe and Koenig, P.C.

(57) ABSTRACT

Providing a method for pyrolysis treatment of oily sludge and environment-friendly renovation of the residue thereof with humic acid substance. The method relates to inside-mixing solid heat carrier with oily sludge to improve the liquid yield, and completely removing the petroleum hydrocarbons from pyrolyzing residue by calcinating it in a fluidized bed, and using the fractionated large and medium particles as the circulating heat carrier, and discharging the fine particles, and performing environment-friendly renovation with the biological humic acid substance to achieve combinations of the harmless technical measures, thereby achieve harmlessness, reduced quantity and resourceful treatment of the oily sludge.

13 Claims, 1 Drawing Sheet

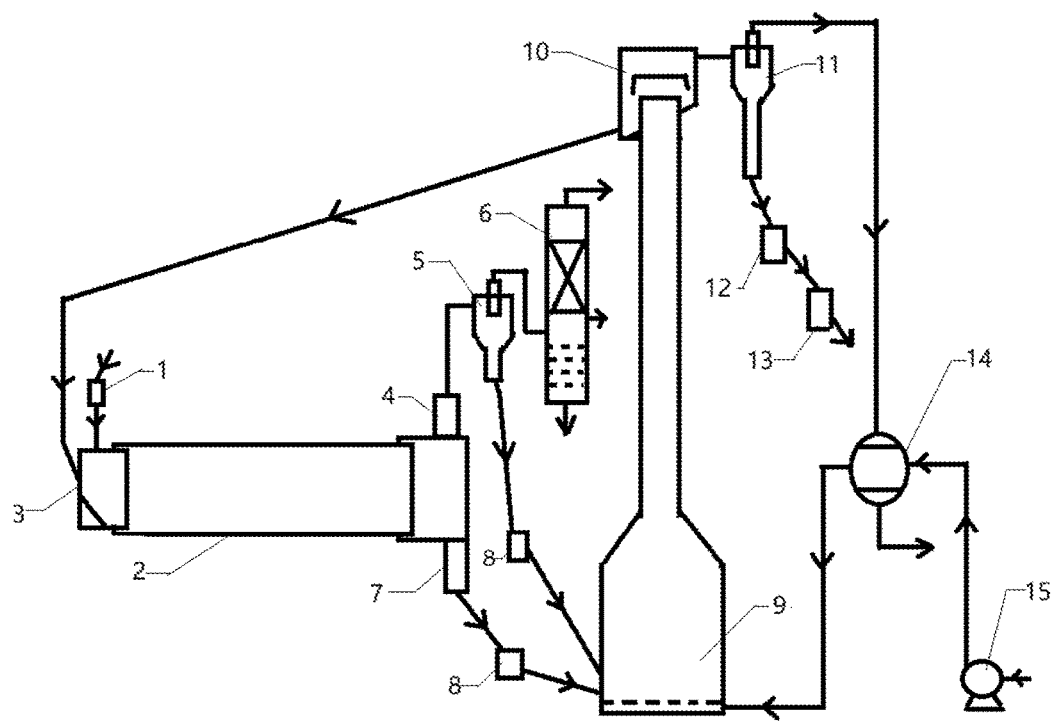

METHOD FOR PYROLYSIS TREATMENT OF OILY SLUDGE AND ENVIRONMENT-FRIENDLY RENOVATION OF THE RESIDUE THEREOF WITH HUMIC ACID SUBSTANCE

CROSS REFERENCE TO RELATED APPLICATIONS

This application claims priority to Chinese Application No. 201811501371.2, filed on Dec. 10, 2018, entitled "Method for Pyrolysis Treatment of Oily Sludge and Environment-friendly Renovation of the Residue Thereof with Humic Acid", which is specifically and entirely incorporated by reference.

FIELD OF THE INVENTION

The invention relates to purification and treatment of contaminated soil, especially relates to the renovation of oily sludge, and specifically provides a method for pyrolysis treatment of oily sludge and environment-friendly renovation of the residue thereof with humic acid substance.

BACKGROUND OF THE INVENTION

Oily sludge refers to the soil mixed with heavy oil such as crude oil, various refined oil products, and residual oil, the soil forms an oily sludge which is extremely difficult to be treated. The oil fields will produce a certain amount of oily sludge during the oil and gas production process, the oily sludge is mainly derived from two aspects: a first aspect resides in that the crude oil is carried from the underground stratum to the ground, and is deposited in various facilities such as containers, large tanks and recycling pools, thereby form the sludge which shall be regularly cleared; the second aspect is the landed sludge generated during the oil well operation, perforation of the oil collection and transport pipeline, and oil-stolen activities. The oily sludge is harmful to the human body, plants, water body and organisms. The oil and gas evaporated in the air may irritate the skin, eyes and respiratory organs, result in that the land loses the function of growing plants, it is difficult to treat and renovate the oily sludge. Because the physicochemical properties of the oily sludge in the oil fields are very complicated, it is extremely difficult to separate and treat the oily sludge, which is one of the main pollutants in the petroleum and petrochemical industries. The oily sludge belongs to HW08 hazardous waste according to the "List of National Hazardous Wastes". When confronting with such a troublesome sludge, the enterprises used to deal with oily sludge with two methods, namely burying and incineration.

The burying method is to find a place and dig a pit for the oily sludge, and bury the oily sludge after conducting anti-permeation measures. Such a method will occupy a large amount of land and has a limited capacity. The incineration method is to incinerate the oily sludge at a high temperature. The method may reduce wastes and incinerate pollutants, and recover a part of heat. But the method has disadvantages that it requires to consume a large amount of fuel and the operation cost is high.

The pyrolysis treatment technology of oily sludge refers to decomposing the heavy oil in oily sludge into volatile low-carbon hydrocarbon fuel, synthetic crude oil, solid carbon and the like under the heating condition, the technology is considered as the most promising processing technology with industrialization prospect. At present, the developed pyrolysis treatment technology is mainly the oily sludge pyrolysis treatment technology based on the externally heated rotary kiln reactor, and the effects of reducing quantity and resourceful utilization are very obvious. However, the technology has the defects such as low heating rate and long reaction time, which results in that the liquid yield is low, the large treatment scale cannot be easily achieved, the pyrolysis residue contains a high content of petroleum hydrocarbons and heavy metals, thus the harmless utilization of the residue has become a bottleneck restricting the industrial popularization and application of the technology.

Therefore, high-efficiency pyrolysis of oily sludge and harmless treatment of residue which achieve harmlessness, reduced quantity and resourceful utilization of the oily sludge, it have become the focus and hotspot of current oily sludge treatment.

SUMMARY OF THE INVENTION

The purpose of the invention is to overcome the disadvantages of the existing oily sludge pyrolysis technology and provide a method for pyrolysis treatment of oily sludge and environment-friendly renovation of the residue thereof with humic acid substance. The method relates to inside-mixing solid heat carrier with oily sludge to improve the liquid yield, and completely removing the petroleum hydrocarbons from pyrolyzing residue by calcinating it in a fluidized bed, and using the fractionated large and medium particles as the circulating heat carrier, and discharging the fine particles, and performing environment-friendly renovation with the biological humic acid substance to achieve combinations of the harmless technical measures, thereby achieve harmlessness, reduced quantity and resourceful treatment of the oily sludge.

The inventors of the present invention discover in the research that the pyrolysis of oily sludge performed by mixing the oily sludge with the solid heat carrier can effectively increase temperature rise rate and reduce reaction time, thereby improve the liquid yield. In addition, the inventors discover that the method may stimulate and promote the reproduction and growth of microbial populations, accelerate degradation of polycyclic aromatic hydrocarbons, facilitate soil agglomeration, conserve soil moisture, conserve fertilizers and increase temperature, improve crop stress resistance and yield, assist in the elimination of polycyclic aromatic hydrocarbons in the soil, and demonstrate the advantages of complexing and immobility the heavy metals, as a result, the solid heat carrier is a green environmental renovation material with wide source and low cost.

Thus, the invention provides a method for pyrolysis treatment of oily sludge and environment-friendly renovation of the residue thereof with humic acid substance, comprising:

adding the pulverized oily sludge from the top of front end of an inside-mixing rotary reactor, stirring it with circulating solid hot ash added from the upper side of front end top plate and mixing them in the rotary reactor, heating, vaporizing and pyrolyzing, thereby obtain the dust-containing pyrolysis oil gas and pyrolysis slag; wherein the pulverized oily sludge has a particle size less than 5 mm.

allowing the dust-containing pyrolysis oil gas to be discharged from the top of terminal of the rotary reactor and enters into a gas-solid separator, and allowing the pyrolysis slag to flow out from the bottom of terminal of the rotary reactor and enter bottom of a calcination fluidized bed through a material reverting controller;

allowing the pyrolysis oil gas separated by the gas-solid separator to enter into a fractionation tower to obtain distillate oil or synthetic crude oil and the tower bottom oil, and allow the solid ash to flow into the bottom of the calcination fluidized bed through a material reverting controller, and the tower bottom oil is returned and mixed with the oily sludge;

mixing the pyrolysis slag and the solid ash in the calcination fluidized bed with hot fluidizing air and burning, carrying out a two-stage gas-solid separation at the top of the calcination fluidized bed, returning the large and medium-particle solid hot ash having a particle diameter not less than 0.02 mm into the rotatory reactor through the circulation pipe, allowing fine particle ash having a particle diameter less than 0.02 mm to flow into the cooling tank as a residue for discharge, and allowing the flue gas to pass through an air preheater and then to be discharged;

heating the air pressurized by a blower by the air preheater and allowing it to flow into the bottom of the calcination fluidized bed as the hot fluidizing air;

subjecting the cooled residue to heavy metal detoxification and agglomeration by using humic acid substance, thereby restoring self-healing and planting functions Preferably, the weight ratio of the oily sludge to the circulating solid hot ash is 2:10, the rotational speed of the rotary reactor ranges from 0.2-1200 rpm, and the temperature of the pyrolysis oil gas outlet at terminal of the rotary reactor is within a range of 400-650° C., the retention time of solids in the rotary reactor ranges from 0.002-20 minutes, wherein the solids are oily sludge and solid hot ash.

Preferably, the calcination fluidized bed is operated at a temperature ranging from 600-1,050° C., and the heat fluidizing air has an air velocity ranging from 0.02-18 m/sec.

Preferably, the step of subjecting the cooled residue to heavy metal detoxification and agglomeration by using humic acid substance comprising: uniformly mixing the residue with the humic acid substance to detoxify by in situ reduction, complexation and immobilization for the heavy metal in the residue; after aging for more than 2 days, mixing detoxified residue with semi-coke bacterial fertilizer.

Preferably, the humic acid substance is one or more of humic acid, potassium humate, sodium humate and biomass pyrolysis oil, wherein the biomass pyrolysis oil is a rapid pyrolysis liquid product or bio-oil produced by the gasification process of agricultural and forest residues. For example, the agricultural and forest residues may be stalk, such as corn stalk.

Preferably, the amount of the humic acid substance is 5-30 times of the heavy metal contained in the residue.

Preferably, the semi-coke bacterial fertilizer is obtained by mixing a humectant corresponding to 0.1-2 wt. % of the biological semi-coke powder with biological semi-coke powder uniformly, to produce modified biological semi-coke powder, then evenly loading microbial bacterial fertilizer corresponding to 3-20 wt. % of the biological semi-coke powder on the modified biological semi-coke powder, and drying;

wherein the humectant is an anionic surfactant, a nonionic surfactant, and a silanol nonionic surfactant, and a solvent which has a small surface tension and is miscible with water; the solvent which has a small surface tension and is miscible with water includes one or more selected from the group consisting of ethanol, propylene glycol, glycerin and dimethyl sulfoxide; the humectant may be added in a form of aqueous solution of the humectant;

wherein the microbial fertilizer comprises microbial thallus or microbial metabolites, the microbial thallus is at least one of *Bacillus*, *Saccharomyces cerevisiae*, *Aspergillus oryzae*, *Rhizobium*, *Azotobacteria* and *Phosphorus* bacteria; the metabolite is an active enzyme, which is one or more of a protease and a plant kinase.

Preferably, the loading method comprising: mixing microbial bacterial fertilizer solution and the modified biological semi-coke powder uniformly, to allow the microbial bacterial fertilizer loading on the modified biological semi-coke powder.

Preferably, obtaining the biological semi-coke powder by rapidly pyrolyzing agricultural and forest residues to prepare biological semi-coke, then pulverizing the biological semi-coke into the biological semi-coke powder which has a particle diameter of 0.01-5 mm.

Preferably, a method for rapidly pyrolyzing comprising: pyrolyzing the agricultural and forest residues in reaction conditions of absence of air at 490-600° C. for 0.1-20 s.

Preferably, the oily sludge is pulverized in a pulverizer selecting one of ball mill, cone crusher, toothed roller crusher, baffle crusher, impact crusher, hammer crusher, rotary crusher, and composite crusher, hydraulic crusher, deep cavity crusher, roll crusher, Simmons cone crusher, hydraulic cone crusher and jaw crusher.

Preferably, when medium-low concentration oil hydrocarbon-contaminated soil with an oil hydrocarbon content less than 2 wt. % is renovated and treated, with respect to per cubic meter of soil, the amount of semi-coke bacterial fertilizer is 3-10 kg, the amount of humic acid substance is 5-40 kg; the ratio of nitrogen fertilizer to phosphate fertilizer is 5-10:1, and the amount of nitrogen fertilizer is 0.05-0.2 kg.

wherein, the phosphate fertilizer is one or more of diammonium phosphate, potassium hydrogen phosphate, potassium phosphate and ammonium perphosphate.

wherein, the nitrogen fertilizer is one or more of urea and ammonium hydrogencarbonate.

The methods are implemented and tested according to the above scheme, it is demonstrated that the pyrolysis treatment of oily sludge in the invention is efficient and clean, the renovation method for the residue is reasonable with simple and safe operation and a low production cost; it achieves harmlessness, reduced quantity and resourceful treatment of the oily sludge; in addition, the in-situ detoxification of residue and the immobilization of heavy metals may eradicate the secondary pollution and rebound of the treatment, improve the natural environment with rapid renovation and desirable effect, the restored soil can normally grow trees and flowers and plant a variety of crops, the treatment cost is low, and the method may be applied in a wide range and produce improved economic and social benefits, thereby fulfill the predetermined purpose desirably.

BRIEF DESCRIPTION OF DRAWINGS

The FIGURE is a schematic flow chart of a specific method for pyrolysis treatment of oily sludge and environment-friendly renovation of the residue thereof with humic acid substance provided by the present invention.

DESCRIPTION OF THE REFERENCE SIGNS 1. cone crusher
2. inside-mixing rotary reactor
3. front end top plate
4. oil gas outlet
5. gas-solid separator
6. fractionation tower
7. pyrolysis slag outlet 8. material reverting controller
9. calcination fluidized bed
10. primary separator
11. secondary separator
12. cooling tank
13. residue modification restorer
14. air preheater
15. blower

DETAILED DESCRIPTION OF THE EMBODIMENTS

The technological characteristics of the invention will be described in detail with reference to the drawings and examples.

The semi-coke bacterial fertilizer is obtained by preparing the silanol nonionic surfactant GSK-588 corresponding to 0.5 wt. % of the biological semi-coke powder into the 2 wt. % aqueous solution, mixing the aqueous solution with the biological semi-coke powder uniformly so as to prepare a modified biological semi-coke powder, then the microbial bacterial fertilizer is uniformly loaded on the modified biological semi-coke powder, and performing a low-temperature drying under a temperature less than 45° C.; wherein the microbial bacterial fertilizer is a microbial bacterial fertilizer solution containing *Bacillus, Rhizobium, Azotobacteria* and *Phosphorus* bacteria corresponding to 10 wt. % of the biological semi-coke powder.

The biomass pyrolysis oil and biological semi-coke are obtained by pyrolysis reaction of corn stalk in a condition of absence of air and a temperature of 550° C. for 10 seconds, wherein the biological semi-coke is pulverized into the powder having a particle size of 0.01-5 mm to prepare the biological semi-coke powder, which is used for preparing the semi-coke bacterial fertilizer.

Example 1

The sludge with an oil content of 15 wt. % is pulverized by a cone crusher (1), then the pulverized soil is added to an inside-mixing rotary reactor (2) from the top of front end of the inside-mixing rotary reactor (2), stirring the pulverized soil with circulating solid hot ash added from the upper side of the front end top plate (3) and mixing them in the rotary reactor (2), rapidly heating, vaporizing and pyrolyzing, thereby obtain the dust-containing pyrolysis oil gas and pyrolysis slag; wherein the weight ratio of the oily sludge to the circulating solid hot ash is 2:10, the rotation speed of the rotary reactor (2) is 600 rpm, the pulverized oily sludge has a particle size less than 5 mm.

The dust-containing pyrolysis oil gas are discharged from an oil gas outlet (4) at the top of terminal of the rotary reactor (2) and enter into a gas-solid separator (5), the pyrolysis slag flows out from a pyrolysis slag outlet (7) at the bottom of terminal of the rotary reactor (2), and enters into the bottom of a calcination fluidized bed (9) through a material reverting controller (8); wherein the temperature of the oil gas outlet (4) at the terminal of the rotary reactor (2) is within a range of 400-650° C., and the retention time of solids in the rotary reactor ranges from 5-10 minutes.

The pyrolysis oil gas separated by a gas-solid separator (5) enters into a fractionation tower (6) to obtain distillate oil or synthetic crude oil and the tower bottom oil, and the solid ash flows into the bottom of a calcination fluidized bed (9) through the material reverting controller (8), and the tower bottom oil is returned and mixed with the oily sludge; wherein the calcination fluidized bed (9) is operated at a temperature ranging from 850-950° C., and the air velocity of the fluidizing air is 10-15 m/sec.

The pyrolysis slag and the solid ash are mixed with the hot fluidizing air and burning in the calcination fluidized bed (9), and then are subject to gas-solid separation by a primary separator (10) on the top of the calcination fluidized bed (9), the large and medium-particle solid hot ash having a particle diameter not less than 0.02 mm is returned into the rotatory reactor (2) through the circulation pipe, the flue gas is introduce into a secondary separator (11) for further gas-solid separation; the fine particle ash having a particle diameter less than 0.02 mm flows into the cooling tank (12) as a residue for discharge, and the flue gas passes through an air preheater (14) and is then discharged to the outside;

The air pressurized by a blower (15) is heated by an air preheater (14) and then flows into the bottom of the calcination fluidized bed (9) as the hot fluidizing air;

The cooled residue is detected, wherein the polycyclic aromatic hydrocarbon is not detected, the content of chromium is 150 ppm. The humic acid substance is used to detoxify and agglomerate the heavy metals in a residue modification restorer (13), thereby restore self-healing and planting functions. The specific process is as follows:

Relative to the residue of per cubic meter, 10 kg sodium humate is mixed with the residue uniformly to perform in situ reduction, complexation and immobilization for detoxifying the heavy metal in the residue, the sodium humate promotes soil agglomeration to encapsulate and block the exudation and migration of heavy metals in the particles; after aging for more than 2 days, the detoxified residue is mixed with 10 kg of semi-coke bacterial fertilizer evenly with respect to the detoxified residue of per cubic meter; 0.1 kg of urea and 0.01 kg of ammonium phosphate are applied at the same time, the active humic acid substance continuously generated by the microbial population is used for achieving the permanent reduction and immobilization for heavy metal.

When the soil is flattened in situ, and the ryegrass can be planted as a raw material for biomass gasification. When measured according to the standard methods stipulated in *HJ784-2016 Determination of Soil and Polycyclic Aromatic Hydrocarbons, High Performance Liquid Chromatography,* and *GB15618-1995 Soil Environment Quality standards*, the aromatic hydrocarbon is not detected after 15 days, the fixation rate of chromium is greater than 95%, the removal effects for polycyclic aromatic hydrocarbons and immobilization effects for heavy metal can meet the requirements of national standards within 30 days, thereby restore self-healing and planting functions of the soil.

The method for pyrolysis treatment of oily sludge and environment-friendly renovation of the residue thereof with humic acid substance provided by the present invention have the following advantages: the temperature rise rate is greater than 1,000° C./s by means of the circulating hot ash fractionation to obtain large and medium granule hot ash which is used as the circulating heat carrier; in addition, the fine particle hot ash is used as the residue for being discharged to outside, and the tower bottom oil is returned as the raw material for circulating pyrolysis, it solves the difficult problems that the liquid derived from the solid pyrolysis has high ash content, the oil quality is poor and the oil content in the residue is high. The liquid yield reaches 85% of the oil contained in the oily sludge, and the residue is oil-free with the carbon content less than 1%; a combination of the humic acid substance and semi-coke bacterial fertilizer performs rapid and permanent detoxification of the residue, and the heavy metal is not detected following the immobilization and removal process.

Example 2

The pyrolysis treatment of oily sludge and an environment-friendly renovation of the residue thereof with humic acid substance is performed according to the method in Example 1, the difference resides in that the sodium humate is replaced with an equivalent amount of biomass pyrolysis oil.

The aromatic hydrocarbon is not detected after 15 days, the fixation rate of chromium is greater than 99%, and the removal effects for polycyclic aromatic hydrocarbons and immobilization effects for heavy metal can meet the requirements of national standards within 26 days thereby restore self-healing and planting functions of the soil.

The method for pyrolysis treatment of oily sludge and environment-friendly renovation of the residue thereof with humic acid substance provided by the present invention have the following advantages: the temperature rise rate is greater than 1,000° C./s by means of the circulating hot ash fractionation to obtain large and medium granule hot ash which is used as the circulating heat carrier; in addition, the fine particle hot ash is used as the residue for being discharged to outside, and the tower bottom oil is returned as the raw material for circulating pyrolysis, it solves the difficult problems that the liquid derived from the solid pyrolysis has high ash content, the oil quality is poor and the oil content in the residue is high. The liquid yield reaches 87% of the oil contained in the oily sludge, and the residue is oil-free with the carbon content less than 0.8%; a combination of the humic acid substance and semi-coke bacterial fertilizer performs rapid and permanent detoxification of the residue, and the heavy metal is not detected following the immobilization and removal process.

Example 3

The pyrolysis treatment of oily sludge and an environment-friendly renovation of the residue thereof with humic acid substance is performed according to the method in Example 2, the difference resides in that the semi-coke bacterial fertilizer is added together with the biomass pyrolysis oil, and then be subjected to aging and other post-treatment.

The aromatic hydrocarbon is not detected after 15 days, the fixation rate of chromium is greater than 90%, and the removal effects for polycyclic aromatic hydrocarbons and immobilization effects for heavy metal can meet the requirements of national standards within 45 days thereby restore self-healing and planting functions of the soil.

The method for pyrolysis treatment of oily sludge and environment-friendly renovation of the residue thereof with humic acid substance provided by the present invention have the following advantages: the temperature rise rate is greater than 1,000° C./s by means of the circulating hot ash fractionation to obtain large and medium granule hot ash which is used as the circulating heat carrier; in addition, the fine particle hot ash is used as the residue for being discharged to outside, and the tower bottom oil is returned as the raw material for circulating pyrolysis, it solves the difficult problems that the liquid derived from the solid pyrolysis has high ash content, the oil quality is poor and the oil content in the residue is high. The liquid yield reaches 84% of the oil contained in the oily sludge, and the residue is oil-free with the carbon content less than 1.2%; a combination of the humic acid substance and semi-coke bacterial fertilizer performs rapid and permanent detoxification of the residue, and the heavy metal is not detected following the immobilization and removal process.

Comparative Example 1

The sludge with an oil content of 15 wt. % is added from the top of the front end of the rotary kiln externally heated by using the pyrolysis dry gas, the sludge is slowly heated, vaporized and pyrolyzed in the rotary kiln through the heat transferred from the kiln wall to obtain the dust-containing pyrolysis oil gas and pyrolysis slag. The dust-containing pyrolysis oil gas are discharged from the oil gas outlet at the top of the terminal of the rotary kiln and enter into a gas-solid separator, the pyrolysis slag flows out from a pyrolysis slag outlet at the bottom of the terminal of the rotary kiln and then be discharged; wherein the temperature of the oil gas outlet at the terminal of the rotary kiln is within a range of 400-650° C., and the retention time of solids in the rotary kiln ranges from 5-10 minutes.

The pyrolysis oil gas separated by the gas-solid separator enters into the fractionation tower to obtain distillate oil or synthetic crude oil and the tower bottom oil, the pyrolysis gas is used as a heating raw material of the rotary kiln, the solid ash and the pyrolysis slag are mixed and cooled and then discharged to the outside.

The cooled residue is detected, wherein the content of polycyclic aromatic hydrocarbons is 1.5%, the content of chromium is 150 ppm. Performed according to example 1, the humic acid substance is used to detoxify and agglomerate the heavy metals in a residue modification restorer, thereby restore self-healing and planting functions.

After 15 days, the content of aromatic hydrocarbon is detected as 0.5%, the fixation rate of chromium is greater than 95%, and the removal effects for polycyclic aromatic hydrocarbons and immobilization effects for heavy metal can meet the requirements of national standards within 180 days thereby restore self-healing and planting functions of the soil.

The temperature rise rate of heating is less than 800° C./s, and the liquid yield reaches 75% of the oil contained in the oily sludge.

The invention claimed is:

1. A method for pyrolysis treatment of oily sludge and environment-friendly renovation of the residue thereof with humic acid substance, comprising:
  adding pulverized oily sludge through the top of a front end of an inside-mixing rotary reactor having a terminal with a top and a bottom, stirring the pulverized oily sludge with circulating solid hot ash added from an upper side of a front end top plate and mixing them in the rotary reactor, heating, vaporizing and pyrolyzing, thereby obtain dust-containing pyrolysis oil gas and pyrolysis slag;
  discharging the dust-containing pyrolysis oil gas from the top of the terminal of the rotary reactor into a gas-solid separator, and passing the pyrolysis slag out from the bottom of the terminal of the rotary reactor and into a bottom of a calcination fluidized bed through a material reverting controller;
  passing the pyrolysis oil gas separated by the gas-solid separator into a fractionation tower to obtain distillate oil or synthetic crude oil and tower bottom oil, and passing the solid hot ash into the bottom of the calcination fluidized bed through the material reverting controller, and returning the tower bottom oil to the oily sludge and mixing the tower bottom oil with the oily sludge;

mixing the pyrolysis slag and the solid ash in the calcination fluidized bed with hot fluidizing air and burning, carrying out a two-stage gas-solid separation at the top of the calcination fluidized bed, returning large and medium-particles of the solid hot ash having a particle diameter not less than 0.02 mm into the rotatory reactor through the circulation pipe, passing fine particles of the solid hot ash having a particle diameter less than 0.02 mm into a cooling tank as a residue for discharge, and passing flue gas through an air preheater and then to be discharged;

heating air pressurized by a blower by the air preheater and passing the air into the bottom of the calcination fluidized bed as hot fluidizing air;

subjecting the cooled residue to heavy metal detoxification and agglomeration by using humic acid substance.

2. The method according to claim 1, wherein the weight ratio of the oily sludge to the circulating solid hot ash is 2:10, the rotational speed of the rotary reactor ranges from 0.2-1200 rpm, and the temperature of the pyrolysis oil gas outlet at the terminal of the rotary reactor is within a range of 400-650° C., the retention time of solids in the rotary reactor ranges from 0.002-20 minutes, wherein the solids are oily sludge and solid hot ash.

3. The method according to claim 1, wherein the calcination fluidized bed is operated at a temperature ranging from 600-1,050° C., and the heat fluidizing air has an air velocity ranging from 0.02-18 m/sec.

4. The method according to claim 1, wherein the step of subjecting the cooled residue to heavy metal detoxification and agglomeration by using humic acid substance comprises: uniformly mixing the residue with the humic acid substance to detoxify by in situ reduction, complexation and immobilization for the heavy metal in the residue; and after aging for more than 2 days, mixing detoxified residue with semi-coke bacterial fertilizer.

5. The method according to claim 1, wherein the humic acid substance is one or more of humic acid, potassium humate, sodium humate and biomass pyrolysis oil.

6. The method according to claim 5, wherein the amount of the humic acid substance is 5-30 times of the heavy metal contained in the residue.

7. The method according to claim 4, wherein the semi-coke bacterial fertilizer is obtained by uniformly mixing a humectant with biological semi-coke powder where the humectant corresponds to 0.1-2 wt. % of the biological semi-coke powder, to produce modified biological semi-coke powder, then evenly loading microbial bacterial fertilizer corresponding to 3-20 wt. % of the biological semi-coke powder on the modified biological semi-coke powder, and drying;

wherein the humectant is an anionic surfactant, a nonionic surfactant, and a silanol nonionic surfactant in a solvent that has a small surface tension and is miscible with water; the solvent including one or more selected from the group consisting of ethanol, propylene glycol, glycerin and dimethyl sulfoxide;

wherein the microbial fertilizer comprises microbial thallus or microbial metabolites, the microbial thallus from at least one of *Bacillus, Saccharomyces cerevisiae, Aspergillus oryzae, Rhizobium, Azotobacteria* and *Phosphorus* bacteria; and the metabolite is an active enzyme, which is one or more of a protease and a plant kinase.

8. The method according to claim 7, wherein the loading method comprises: mixing microbial bacterial fertilizer solution and the modified biological semi-coke powder uniformly, to allow the microbial bacterial fertilizer loading on the modified biological semi-coke powder.

9. The method according to claim 7, wherein the biological semi-coke powder is obtained by rapidly pyrolyzing agricultural and forest residues to prepare biological semi-coke, then pulverizing the biological semi-coke into the biological semi-coke powder, which has a particle diameter of 0.01-5 mm.

10. The method according to claim 9, wherein the step of rapidly pyrolyzing comprises: pyrolyzing the agricultural and forest residues in reaction conditions of absence of air at 490-600° C. for 0.1-20 s.

11. The method according to claim 1, wherein the oily sludge is pulverized in a pulverizer selecting one of ball mill, cone crusher, toothed roller crusher, baffle crusher, impact crusher, hammer crusher, rotary crusher, and composite crusher, hydraulic crusher, deep cavity crusher, roll crusher, Simmons cone crusher, hydraulic cone crusher and jaw crusher.

12. The method according to claim 4, wherein the oily sludge is medium-low concentration oil hydrocarbon-contaminated soil with an oil hydrocarbon content less than 2 wt. % with respect to per cubic meter of the soil, the semi-coke bacterial fertilizer is at an amount of 3-10 kg with respect to per cubic meter of the soil, the humic acid substance is at an amount of 5-40 kg with respect to per cubic meter of the soil; and with nitrogen fertilizer to phosphate fertilizer at a ratio of 5-10:1, nitrogen fertilizer is at an amount of 0.05-0.2 kg with respect to per cubic meter of the soil.

13. The method according to claim 12, wherein the phosphate fertilizer is one or more of diammonium phosphate, potassium hydrogen phosphate, potassium phosphate and ammonium perphosphate; and the nitrogen fertilizer is one or more of urea and ammonium hydrogen carbonate.

\* \* \* \* \*